Patented May 16, 1939

2,158,984

UNITED STATES PATENT OFFICE 2,158,984

WELDING ROD

Arthur R. Lytle and Thomas H. Vaughn, Niagara Falls, N. Y., assignors to Oxweld Acetylene Company, a corporation of West Virginia No Drawing. Application May 13, 1938, Serial No. 207,777

8 Claims. (Cl. 219—8)

This invention relates to welding rods for fusion deposition welding by electric arc and oxygen-gas methods. This application is in part a continuation of our application Serial No. 135,939, filed April 9, 1937.

The majority of fusion deposition welding operations involve the use, in addition to a welding rod and a source of heat, of a weld modifying substance, usually a solid in powdered or granular form. For instance, most of such operations require the use of inorganic fluxes to dissolve the metal oxides which otherwise would interfere with the production of a sound, strong weld. In gas welding procedures, the flux is usually applied by dipping the hot end of the welding rod into the flux, whereupon a small amount of flux adheres to the hot rod and is thereby conveyed to the welding puddle. This method of using flux has several disadvantages: it wastes flux and time, it is inconvenient, the supply of flux is uneven and frequently insufficient, and the weld is non-uniform in appearance and strength. Sometimes the flux is made into a paste with water and applied to the entire rod, and sometimes the entire rod is heated and rolled in flux to produce a rough and uneven coating; but these expedients do not provide a strong, adherent, uniform coating which will withstand handling or shipment. Arc welding electrodes are usually coated with a flux held in place with a fabric or a binder such as sodium silicate.

A practice that is increasing in popularity is to introduce alloying elements into the weld by coating a ductile metal welding rod with comminuted metals or alloys. In this manner such elements as chromium, tungsten, manganese, and silicon may be added to the weld puddle. Sometimes a mixture of a reducible compound of the desired metal with a reducing agent is used instead of the metal itself. Such coatings frequently contain, also, cleansing, scavenging, and deoxidizing agents. The types of materials discussed above are hereinafter referred to collectively as weld modifying substances.

The problem of providing a wholly satisfactory coating of weld modifying substances on a welding rod, for either electric arc or gas welding, is primarily a problem of providing a suitable binder. The binder must either completely disappear during welding without adversely affecting the welding or leaving a charred residue or producing smoke, fume, or disagreeable odor, or else float freely on the surface of the molten weld metal so as not to leave surface flaws in the completed weld. Furthermore, the binder must not interfere with the action of the flux; it must cling tenaciously to the welding rod despite rough handling and wide changes in temperature; it must be flexible, tough, and water resistant; it must not lose its toughness or adherence during storage or moderate exposure to weathering; and it must be capable of binding the desired amount of material to the rod. If the rod is to be used for arc welding, the binder must not adversely affect arc stability. We have tested numerous binding materials, both organic and inorganic, and have found that most materials fail to meet one or more of these requirements.

We have discovered that certain thermoplastic synthetic resins may be used successfully as binders for coating welding rods with solid subdivided weld modifying substances. Specifically, resins formed by the polymerization of vinyl compounds or acrylic compounds are suitable. Preferred polymerized compounds include polyvinyl halides; polyvinyl esters of aliphatic acids, and their mixtures or conjoint polymers with polyvinyl halides; polystyrene; partial polyvinyl acetal resins, and especially those acetalized with aliphatic aldehydes having from two to six carbon atoms; and polymerized esters of acrylic acid or its derivatives or mixtures thereof.

The invention accordingly includes a welding rod comprising a metal core provided with a coating comprising at least one comminuted solid weld modifying substance and a binder containing essentially a thermoplastic resin selected from the group consisting of polyvinyl halides, polyvinyl esters of aliphatic acids, polystyrene, and polymerized esters of acrylic acid and its homologues. Coatings according to our invention may be prepared and applied to welding rods in a number of ways. For example, a rod coated with weld modifying substance may be covered with a film of resin, or the rod may be dipped into a mixture of weld modifying substance with a solution of the resin in a suitable solvent and the solvent then evaporated; or a paste of a resin, a solvent, and a weld modifying substance, may be prepared and applied to the rod by brushing or dipping; or, preferably, a mixture of thermoplastic resin, solvent, and weld modifying substance is extruded over the rods. The following specific examples include a number of procedures typical of those which we have employed successfully, but our invention is not limited to these examples. In all examples, proportions are given in parts by weight unless otherwise indicated.

*Example 1.*—Bronze welding rods were coated with a flux mixture, consisting of 18 parts of fused borax and 82 parts of boric acid, by warming the rods and rolling them in the powdered mixture. The still warm coated rods were then spirally wrapped with ribbons of a thermoplastic resin comprising a partial polyvinyl acetal resin acetalized with butyraldehyde. The ribbons were self-sealed by heat to form a moisture-proof coating over the flux. The coated rods had satisfactory welding and physical properties.

*Example 2.*—A solution of polyvinyl acetate resin was prepared by dissolving one part of this substance in six parts of acetone. Three hundred parts of this solution was well mixed with 266 parts of flux mixture 18% borax-82% boric acid and 100 parts each of methyl isobutyl ketone and methyl amyl ketone. This mixture of flux, binder, and solvent was ground in a ball mill for a period of about eight hours. Bronze rods were coated with the material by dipping. Welds made with these coated rods were entirely satisfactory from every point of view.

*Example 3.*—Thirty parts of an aluminum flux (23 parts KCl, 23 parts NaCl, 4 parts LiF) were mixed with ten parts each of methyl isobutyl ketone and methyl amyl ketone. This mixture was stirred into thirty parts of a polyvinyl acetate solution containing one part of polyvinyl acetate resin to each six part of acetone. Aluminum rods were coated with this composition by dipping, and the material adhering to the rod was dried, forming a tough, flexible coating. Welding tests proved that the fluxing action of rods coated in this manner is entirely satisfactory. A dark deposit left on the weld is easily removable with water and is not objectionable in any way.

*Example 4.*—A solution was prepared consisting of thirty parts of methyl alcohol and four parts of a partial polyvinyl acetal resin acetalized with butyraldehyde. Thirty parts of this solution was mixed with forty-five parts of aluminum flux (23 parts KCl, 23 parts NaCl, 4 parts LiF) and forty-five parts of isobutyl alcohol, and the mixture ground in a ball mill for seven hours. The balls were removed by screening, and 2.5 parts of water were added to each 94.5 parts of the mixture. Aluminum welding rods (0.25 inch diameter) were coated with this mixture by dipping, and the coatings were found to be extremely flexible, waterproof, and highly resistant to abrasion. The welding properties of the coated rods were excellent.

*Example 5.*—A composition consisting of 70 parts of a 20% solution of polymerized acrylic acid ester in ethylene dichloride (trade name: "Acryloid B-7"), 30 parts of propylene dichloride, 18 parts of methyl isobutyl ketone, 0.94 part of dibutyl phthalate, 49.2 parts of boric acid, and 20.4 parts of borax ($Na_2B_4O_7.10H_2O$) was ground in a porcelain-lined ball mill with porcelain balls. Bronze rods were dipped into the coating composition and slowly withdrawn. The coating formed on drying the material adhering to the rod was extremely flexible and securely adherent. The welding and fluxing properties of a rod so treated were quite satisfactory.

*Example 6.*—A partial polyvinyl acetal resin acetalized with butyraldehyde to about 70% acetalization was dissolved in methyl alcohol and mixed with an approximately equal weight of a flux containing 88% sodium borosilicate and 12% lithium fluoride. The viscosity of the solution was adjusted by adding butyl alcohol until a coating 0.35 mm. thick was produced on ¼ inch cobalt-chromium-tungsten alloy rods by dipping. The physical properties of coatings so prepared were good and the welding properties of the coated rods were excellent.

*Example 7.*—22.5 parts of a 20% solution of polymerized acrylic acid ester in ethylene dichloride (trade name: "Acryloid B-7") were thoroughly mixed with 105 parts of high carbon ferrochromium, 31.5 parts of medium carbon ferro-manganese, 4.5 parts of manganese-titanium alloy, and 4.5 parts of coke flour. Steel core wire was coated with this mixture by extrusion, the coating amounting to between 20% and 35% of the weight of the coated rod. The coated rod was successfully used as an electric welding electrode to deposit a wear-resistant layer of chromium-manganese steel on a mild steel base.

*Example 8.*—7.5 parts of a methyl methacrylate polymer (trade name: "Lucite") dissolved in about 15 parts of trichlorethylene (or acetone) was substituted for the "Acryloid B-7", and 4.5 parts of ferrotitanium may be substituted for the manganese-titanium, of example 7, without substantially changing the results.

*Example 9.*—7.5 to 9 parts of polyvinyl acetate dissolved in about 15 parts of trichlorethylene (or acetone) were mixed with 105 parts of high carbon ferrochromium, 30 parts of medium carbon ferromanganese, 4.5 parts of ferrotitanium, and 4.5 parts of coke flour. The mixture was applied to mild steel core wires by extrusion and the coated wires were successfully used as arc welding electrodes.

*Example 10.*—6 parts of ferrosilicon (about 50% Si, 50% Fe) were substituted for the ferrotitanium and coke flour in the mixture of example 9, and the resulting mixture was coated onto mild steel wire in an amount between 20% and 35% of the weight of the coated wire. The coated wire was successfully used to deposit a wear-resistant chromium-manganese steel by gas-flame fusion deposition welding methods.

The physical properties of many of these coatings may be improved by baking. The texture and general appearance of the coating may be regulated to some extent by controlling the particle size of the weld modifying substance used. Suitable plasticizers may be used to increase the toughness and flexibility of the coat.

Welding with the rods treated according to our invention has numerous advantages over the method heretofore used of applying flux to the weld by dipping the hot, uncoated welding rod into a supply of flux. The use of rods coated with flux is more convenient, faster, and provides welds of a uniform appearance and of uniform and improved physical properties. Using bronze rods of identical compositions, it was observed experimentally that six welds made with gas welding by the method of dipping the hot bare rod in flux had ultimate tensile strengths varying from 38,200 to 60,900 pounds per square inch, whereas five welds made with rods coated according to this invention had ultimate tensile strengths varying from 66,600 to 67,500 pounds per square inch. Half of the welds made by the dip method broke in the weld scarf, while all but one of the welds made with the coated rods broke in the steel plate.

A preferred binder for use on aluminum and aluminum-base alloy welding rods for gas welding is a partial polyvinyl acetal resin acetalized with one of the group consisting of propionaldehyde between 52% and 92%, butyraldehyde between 42% and 82%, and valeraldehyde between 33% and 62%. Solutions of polyvinyl acetal resins cannot successfully be used with fluxes containing boron compounds, because such compounds tend to precipitate the resin. For copper and copper-base alloy welding rods the preferred binder is polymerized ester of acrylic acid and its homologues.

In addition to the resins mentioned specifically above, any thermoplastic solid resin formed by the polymerization, condensation, or reaction of one or more compounds of the acetylene, vinyl, styrene, phenyl, acrylic, aldehyde, ketone, and alkyd types may be used as a binder, provided, of course, that the resin has the above-described essential characteristic of burning slowly in a welding flame without yielding disagreeable fumes or odors and without depositing a char that interferes with the welding operation.

We claim:

1. Welding rod comprising a metal core and an adherent coating thereon, such coating comprising a solid weld modifying substance and a thermoplastic resin selected from the group consisting of polyvinyl halides, polyvinyl esters of aliphatic acids, polystyrene, and polymerized esters of acrylic acid and its homologues; which resin burns slowly in a welding flame without yielding disagreeable fumes or odors and without depositing a char that would interfere with the welding operation.

2. Welding rod as defined in claim 1, in which the coating comprises solid inorganic weld modifying substance and polyvinyl acetate.

3. Welding rod as defined in claim 1, in which the coating comprises a solid inorganic weld modifying substance and a conjoint polymer of vinyl acetate and vinyl chloride.

4. Welding rod as defined in claim 1, in which the coating comprises a solid inorganic weld modifying substance and a partial polyvinyl acetal resin acetalized with an aliphatic aldehyde having two to six carbon atoms.

5. Welding rod as defined in claim 1, in which the coating comprises a solid inorganic weld modifying substance and a partial polyvinyl acetal resin acetalized with propionaldehyde between 52% and 92%, butyraldehyde between 42% and 82%, and valeraldehyde between 33% and 62%.

6. Welding rod comprising a metal core and an adherent coating essentially including a solid inorganic welding flux and a resin formed by the polymerization of at least one ester selected from the group consisting of the esters of acrylic acid and its homologues.

7. Welding rod as defined in claim 6, in which the resin is a polymerized methyl methacrylate.

8. Welding rod comprising a metal core and an adherent coating thereon essentially including an inorganic welding flux and a thermoplastic resin formed from at least one compound of the acetylene, vinyl, styrene, phenolic, acrylic, aldehyde, ketone, and alkyd types; which resin burns slowly in a welding flame without yielding disagreeable fumes or odors and without depositing a char that interferes with the welding operation.

ARTHUR R. LYTLE.
THOMAS H. VAUGHN.